Oct. 11, 1966  N. LALLI  3,277,933
DUPLICATING DEVICE FOR WOODTURNING LATHES
Original Filed July 16, 1962
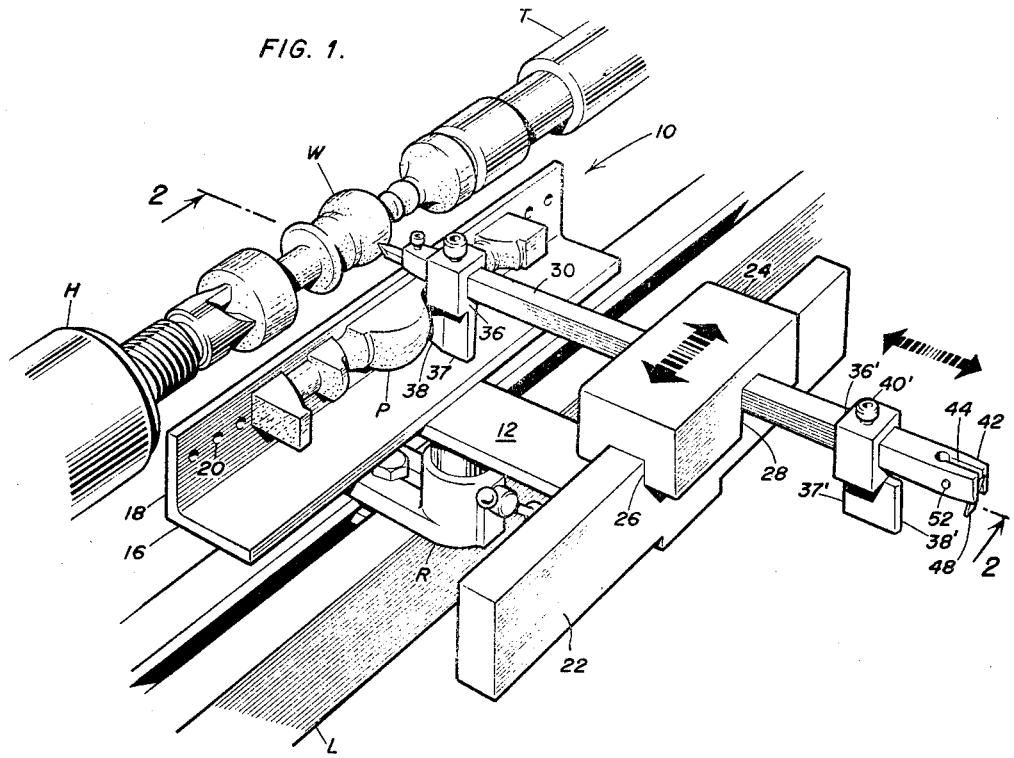
NICHOLAS LALLI
INVENTOR
BY Walter G. Finch
ATTORNEY

United States Patent Office 3,277,933
Patented Oct. 11, 1966

3,277,933
DUPLICATING DEVICE FOR WOODTURNING LATHES
Nicholas Lalli, 113 N. Portland Ave., Ventnor City, N.J.
Continuation of application Ser. No. 209,822, July 16, 1962. This application Apr. 8, 1964, Ser. No. 360,474
4 Claims. (Cl. 142—47)

This invention relates generally to turning lathes, and more particularly it pertains to a pattern follower tool holder for duplicating work. This application is a continuation of U.S. patent application Serial No. 209,822, filed July 16, 1962, for "Duplicating Device for Woodturning Lathes," by applicant and now abandoned.

It is an object of this invention to provide a simple tool holder-pattern follower which will guide a blind or partially disabled operator in duplicating involved lathe-turned work.

Another object of this invention is to provide a slide rest and tool holder for a lathe which correctly positions a tool for use against a workpiece and/or a templet without loss of "feel" to the operator.

A safe tool slide rest which prevents a tool from catching in the work and injuring the operator and which is easily disassembled and reassembled for tool changing is another object of this invention.

Yet another object of the invention is to provide a safety tool blade holder which shaves material from a workpiece to an adjustable depth with no danger of gouging.

These and other objects and attendant advantages of this invention will become more readily apparent and understood from the following detailed specification and single sheet of accompanying drawings in which:

FIG. 1 is a perspective view of a duplicating device incorporating features of this invention shown in operative position on a woodturning lathe;

FIG. 2 is a side elevation partly in section taken on line 2—2 of FIG. 1; and

FIG. 3 is an enlarged perspective view of one end of the tool holder of the device of FIGS. 1 and 2 illustrating details of a safety tool blade arrangement.

Referring now to FIGS. 1 and 2 of the drawings, a duplicating device, identifying generally at 10, is shown installed on a wood turning lathe L. A crossbar 12 is provided on its undersurface, with a boss 14 which is locked into the rest holder R of the tool of the lathe L.

The holder R is, in turn, secured to the bed of the lathe L in the conventional manner shown. An angular tool rest 16 is secured as by welding, to one end of bar 12 and a guide rail 22 is similarly secured, parallel to the tool rest, at the opposite end of the bar.

A vertical web 18 is formed integrally with the tool rest 16 and it is pierced by a plurality of holes 20 through which are passed screws 21 so as to fasten a pattern piece P to the web.

A guide block 24 is arranged, by means of a longitudinal groove 26, to slide along the upper edge of rail 22. A second and somewhat deeper groove 28 runs transversely across the underside of block 24.

A sliding tool holder 30 resides within the slot 28 with its lower surface resting on rail 22. As shown in FIGS. 1 and 2, one end 33 of tool holder 30 rests on the upper edge of the web 18 and it is provided with a hole 31 into which a cutting tool 32 is locked by a screw 34.

A pattern follower 36 is adjustably secured by a screw 40 to the tool holder 30. The follower 36 is formed with a depending member 37, of reduced thickness, one edge of which tapers to a knife edge 38. The opposite end 42 of tool holder 30, as best illustrated in FIG. 3, is arranged with a vertical slot 44 into each side of which there is formed one of a pair of opposed slots 46 set at a slight angle to the vertical end surface of the holder 30.

A small chisel-like cutting tool blade 48 is adjustably secured in the slots by a lockscrew 52. A pattern follower 36 is adjustably secured by screw 40 to the holder 30 near its end 42. Follower 36' is similar to follower 36 with the exception that its depending member 37' has its pattern following edge 38' softly rounded rather than feathered to a knife edge as on follower 36.

The duplicating device 10 is used in the following manner. The pattern P is turned in the conventional manner after which it is split along its axis and one of the pattern halves thus formed is secured to the web 18. If the diameter of the pattern is greater than the height of the web enough material must be planed from the edges of the pattern, before securing it to the web 18, in order to allow the tool holder 30 to rest on the upper edge of the web.

The duplicating device 10 is then installed on the lathe L and adjusted so that the web is parallel to the lathe axis, and so that the point of either cutting tool is brought into the horizontal plane of the axis of the lathe headstock H and tailstock T. A workpiece W is then installed between the headstock H and tailstock T after which turning may proceed.

The operator rests his left hand upon the guide block 24 continually repositioning it to the right or left as with his right hand he advances and retracts tool holder 30 to and from workpiece W.

End 42 of tool holder 30 is used during the early or "roughing" stage of turning whereas end 33 is used during the finishing and detailing stage.

A particular advantage to be gained from the use of end 42 derives from its tendency, because of the plane-like arrangement of its blade, to draw itself into the work while at the same time limiting the depth of the cut to the amount the cutting edge 50 of blade 48 protrudes from the end face of the tool.

The blunted edge 38' of follower 36', because of its inability to enter the narrower detailed areas of the pattern piece, will obviate the possibility of having blade 48 destroy similar areas on the work piece. Upon completion of the rough cutting, stage tool 30 is turned end-for-end and end 33 is used to complete the final detailed cuts.

It should be noted that in the absence of a pattern P the duplicating device 10 still functions as an improved slide rest and thus can be used by unsteady hands for performing original turned work if desired.

In any case there is no danger to the operator from a suddenly caught tool since the latter is always positioned at a safe correct angle to the work. Furthermore, the operation proceeds in a normal two-handed manner with no crank or lever operated mechanism to preclude the "feel" which is all-important to the blind.

For long work it is only necessary to provide two bosses 14 held by two tool rest holders R to furnish the required stability.

Obviously many modifications and variations of the present invention are possible in light of the above teachings. It is, therefore, to be understood that within the scope of the appended claims the invention may be practiced otherwise than as specifically described.

What is claimed is:

1. A tool guiding attachment for a lathe having a carriage and head and tail stock arranged to accept a work piece therebetween, said attachment comprising a crossbar adjustably mounted on said carriage of said lathe, guide rail members mounted at opposite ends of said crossbar, tool holder means including an elongated member positioned transversely with respect to said rail members and in transverse and sideways slidable contact with each of said rail members and cutting means secured to at least one end of said elongated member, and guide means slidably mounted upon one of said rail members and having a transverse groove for slidably receiving said elongated member to control sideways and transverse motion of said tool holder means.

2. A tool guiding attachment for a lathe having a carriage and head and tail stock arranged to accept a work piece therebetween, said attachment comprising a crossbar adjustably mounted on said carriage of said lathe, guide rail members mounted in upright, parallel relationship on said crossbar, coplanar therewith and at opposite ends thereof, guide means slidably mounted on one of said rail members, said guide means having a groove therein transverse to the direction of said rail members, and tool holder means including an elongated member slidably positioned within said groove in said guide means and resting on each of said rail members and cutting means secured to at least one end of said elongated member, whereby said tool holder means are movable towards and away from said work piece and simultaneously along the length thereof, said motions being controllable by hand manipulation of said tool holder means and said guide means, respectively.

3. The tool holder means of claim 2 wherein one end of said elongated member has a vertical slot extending longitudinally therein and clamping means are positioned across the width of said elongated member at the slotted portion thereof and said cutting means includes a chisel-shaped cutting tool secured partially within said slot by said clamping means, with the cutting edge of said tool positioned substantially horizontal and in an inclined position and spaced from the end of said elongated member by a small enough distance to control the penetration of said cutting edge into a work piece to prevent gouging thereof.

4. A tool guiding attachment for a lathe having a carriage and head and tail stock arranged to accept a work piece therebetween, said attachment comprising a crossbar adjustably mounted on said carriage of said lathe, guide rail members mounted in upright, parallel relationship on said crossbar, coplanar therewith and at opposite ends thereof, a three-dimensional pattern secured lengthwise to one of said rail members, said one of said rail members being the closer to said work piece, guide means slidably mounted on the other of said rail members, said guide means having a groove therein transverse to the direction of said rail members, and tool holder means including an elongated member slidably positioned within said groove in said guide means and resting on each of said rail members, cutting means secured to at least one end of said elongated member, and at least one pattern follower adjustably fastened thereto to contact said three-dimensional pattern, whereby said tool holder means are movable towards and away from said work piece and simultaneously along the length thereof, said motions being controllable by hand manipulation of said tool holder means and said guide means, respectively.

References Cited by the Examiner
UNITED STATES PATENTS

| | | | |
|---|---|---|---|
| 368,851 | 8/1887 | Philion | 142—56 |
| 800,304 | 9/1905 | Hugershoff | 142—38 |
| 1,487,538 | 3/1924 | Chader | 142—38 |
| 1,965,728 | 7/1934 | Tautz | 142—38 |

WILLIAM W. DYER, JR., *Primary Examiner.*

W. D. BRAY, *Assistant Examiner.*